United States Patent [19]

Kumar

[11] Patent Number: 5,208,741
[45] Date of Patent: May 4, 1993

[54] CHOPPER CIRCUIT FOR DYNAMIC BRAKING IN AN ELECTRIC POWER CONVERSION SYSTEM

[75] Inventor: Ajith K. Kumar, Erie, Pa.

[73] Assignee: General Electric Company, Erie, Pa.

[21] Appl. No.: 784,866

[22] Filed: Oct. 30, 1991

Related U.S. Application Data

[62] Division of Ser. No. 676,643, Mar. 28, 1991, Pat. No. 5,117,166.

[51] Int. Cl.[5] .................................... H02M 7/525
[52] U.S. Cl. ..................... 363/124; 318/375
[58] Field of Search .............. 323/232, 282, 351; 363/124; 318/759, 375

[56] References Cited

U.S. PATENT DOCUMENTS

| | | | |
|---|---|---|---|
| Re. 27,128 | 6/1971 | Morgan et al. | 363/124 |
| 3,504,257 | 3/1970 | Smith | 318/252 |
| 3,544,873 | 12/1970 | Gunsser et al. | 318/376 |
| 3,748,560 | 7/1973 | Sawa et al. | 318/430 |
| 3,763,418 | 10/1973 | Beck et al. | 363/124 |
| 3,878,447 | 4/1975 | MacDonald | 318/375 |
| 3,890,551 | 6/1975 | Plunkett | 318/376 |
| 3,947,740 | 3/1976 | Tsuboi | 318/376 |
| 4,017,777 | 4/1977 | Bailey | 318/139 |
| 4,019,108 | 4/1977 | Elvin | 318/353 |
| 4,047,083 | 9/1977 | Plunkett | 318/231 |
| 4,084,119 | 4/1978 | Kuto et al. | 318/434 |
| 4,093,900 | 6/1978 | Plunkett | 318/370 |
| 4,095,166 | 6/1978 | Shibata et al. | 363/124 |
| 4,216,420 | 8/1980 | Jinbo et al. | 318/370 |
| 4,284,936 | 8/1981 | Bailey et al. | 318/381 |
| 4,355,267 | 10/1982 | Frantz et al. | 318/89 |
| 4,380,724 | 4/1983 | Frantz et al. | 318/353 |
| 4,393,338 | 7/1983 | Jones et al. | 318/86 |
| 4,424,558 | 1/1984 | N'Guyen Uyen | 363/124 |
| 4,431,956 | 2/1984 | Angquist | 318/759 |
| 4,450,388 | 5/1984 | Markham | 318/87 |
| 4,471,277 | 9/1984 | Franz, Jr. | 318/376 |
| 4,555,652 | 11/1985 | Brulard | 318/375 |
| 4,567,555 | 1/1986 | Matsuse et al. | 318/762 |
| 4,652,985 | 3/1987 | Bougle | 363/124 |
| 4,733,146 | 3/1988 | Hamby | 318/393 |
| 4,761,600 | 8/1988 | D'Atre et al. | 318/759 |
| 4,904,918 | 2/1990 | Bailey et al. | 318/762 |
| 5,059,887 | 10/1991 | Iida et al. | 363/124 |

Primary Examiner—Steven L. Stephan
Assistant Examiner—Jeffrey Sterrett
Attorney, Agent, or Firm—R. Thomas Payne

[57] ABSTRACT

An improved electrical circuit configuration for a chopper circuit is disclosed which is particularly adapted for use with an inductive load such as a braking resistor of the type used in many rapid transit vehicles. Instead of connecting a di/dt reactor directly in series with the electronic switch of the chopper circuit, a di/dt reactor is connected in series with the freewheeling diode. Using this configuration, the di/dt reactor does not have to continuously handle the average current through the electronic switch during the entire chopping operation. Hence, a much smaller, lighter, and less expensive di/dt reactor can be utilized.

11 Claims, 5 Drawing Sheets

CHOPPER CIRCUIT FOR DYNAMIC BRAKING IN AN ELECTRIC POWER CONVERSION SYSTEM

This application is a division of application Ser. No. 07/676,643, filed Mar. 28, 1991 U.S. Pat. No. 5,117,166.

BACKGROUND OF THE INVENTION

This invention generally relates to the field of electric power conversion systems for conveying power between a direct current (DC) power source and an electric load circuit. More particularly, the present invention relates to an improved electrical circuit configuration for a chopper circuit which is particularly adapted for use with an inductive load such as the braking resistors of the type used in many rapid transit vehicles.

Rapid transit vehicles are typically powered by electric traction motors whose rotatable shafts are mechanically coupled to an axle/wheel set of the vehicle. A wayside conductor, generally located near the right-of-way along which the vehicle travels, provides the DC electric power for the motor. An electric power conversion system is used to condition the DC electric power supplied to the motor load circuits. If a DC motor is used, such a system will include an electric power "chopper" which is suitably controlled to vary the magnitude of load current and/or voltage. In the case of alternating current (AC) motors, the electric power conversion system will typically include an electric power "inverter" functioning as a DC-to-AC converter that is suitably controlled to vary the amplitude and frequency of the load voltage as desired. In either case, electric power flows from the DC source, via the wayside conductor, through the electric power conversion system and into the load during the "motoring" or "propulsion" mode of operation.

Such traction vehicles often depend upon electrical braking by the traction motors to assist mechanical or friction brakes in stopping the vehicle. In order to provide this electrical braking effort, the traction motors are electrically controlled to operate as electrical generators driven by the rolling wheels of the vehicle. Accordingly, in the "electrical braking" or "retarding" mode of operation, the traction motors convert the kinetic energy of the vehicle's inertia into electric power which flows in a reverse direction through the power conversion system, now serving, for example, as an AC-to-DC converter. Thus, the generated voltage appears as a DC voltage at the input terminals to the power conversion system. The method of disposing of this surplus electrical power depends upon the type of electrical braking being utilized.

In general, only two types of electrical braking are in common use: dynamic braking and regenerative braking. Dynamic braking is effected by connecting a dynamic braking resistance between the DC source terminals and dissipating the surplus power. This resistance receives current from the converter, transforms the electrical energy into thermal energy, and dissipates the resulting heat. Regenerative braking, on the other hand, is effected by returning the surplus power to the DC power source during the braking operation. Both dynamic and regenerative braking ability may be incorporated into the same vehicle control system, with an appropriate sensing apparatus for determining when to use dynamic braking and when to use regenerative braking. This combined braking system is commonly referred to as "blending". The desired blending of dynamic and regenerative braking can be accomplished in various different ways which are well known to persons skilled in the art. For example, Plunkett U.S. Pat. No. 4,093,900 utilizes a parallel array of separate braking resistors to perform the blending.

In many dynamic braking systems, a chopper circuit is used to modulate the amount of time during which the dynamic braking resistor is connected in the circuit. The chopper is essentially a controlled electronic switch connected in series with the braking resistor. The average value of the resistor current is thus regulated by varying the ratio of the amount of time the switch is closed, or the switch's "on time", to the amount of time it is open, or its "off time". In modern solid state systems, the chopper includes a power thyristor device connected directly in series with the braking resistor. A silicon controlled rectifier (SCR) or a gate turn-off device (GTO) are two types of thyristor devices which can be used for this electronic switch. The choice of thyristor would depend upon the type of pulse-width modulation (PWM) circuitry used to control the average magnitude of current in the resistor, as well as other circuit parameters.

When a forward voltage is supplied to a thyristor, and it is turned on by means of its gate current, the conduction of anode current across the device junction commences in the immediate neighborhood of the gate connection, and spreads from there across the whole area of the junction. This conduction spreads across the cathode area of the thyristor at a rate of about one centimeter per 100 microseconds. If the rate at which the anode current increases is much greater than the rate at which the conduction area increases, there will be a high power density in the conduction area. This results in a local "hot spot" formed in the neighborhood of the gate connection due to the high current density in that part of the junction that has begun to conduct. Such localized heating may produce excessively high temperatures, may possibly result in permanent damage to the thyristor, and may ultimately result in failure of the dynamic braking circuit. For this reason, the maximum rate of rise of anode current, termed "$di/dt_{MAX}$", is usually specified by the manufacturer of the thyristor device. Typical values for $di/dt_{MAX}$ are 30–200 amperes-per-microsecond (A/$\mu$sec) for phase-controlled SCR's, and as high as 800 A/$\mu$sec for inverter GTO's.

In order to limit the rate of current rise through the thyristor, an external inductor is typically connected directly in series with the thyristor to be protected. This series inductor, termed a "di/dt reactor", need only introduce a small amount of inductance in the circuit, and should not saturate or go into a low impedance state in less than the turn-on time of the thyristor device. For example, a 5 microhenry ($\mu$H) inductor, saturating only after a few microseconds, would sufficiently limit the rate of rise of current in the series combination, thus reducing the series di/dt, and thereby protecting the thyristor device.

Although the inductance value of the di/dt reactor need only be a few microhenrys, the power rating of the di/dt reactor often presents a problem for high-current electric power conversion systems. For example, a rapid transit vehicle operating from a power source of 600 volts DC would have a typical average current of approximately 500 amperes RMS through the series combination of the di/dt reactor and the chopper thyristor. To protect against current spikes, a di/dt reactor having a maximum current rating of 1000 amperes is often used. However, the size of such a di/dt reactor is rather large and heavy, i.e., typically on the order of 10×10×6 inches at approximately 40 pounds. Moreover, such an electrical component can be very expensive, particularly when multiple resistance braking circuits are used in a single electronic power control system.

A need, therefore, exists for an improved chopper circuit for dynamic braking of an electric power conversion system, which provides for the reduction of the size, weight, and cost of the di/dt reactor.

SUMMARY OF THE INVENTION

Accordingly, it is a general object of the present invention to provide an improved electronic power conversion system with dynamic braking.

A more particular object of the present invention is to provide an improved chopper circuit for dynamic braking of an electronic power conversion system, wherein a smaller, lighter, and more cost-effective di/dt reactor can be accommodated.

In accordance with one aspect of the present invention, a chopper circuit is provided for a load, the chopper circuit comprising: circuitry providing a first current path including the load connected in series with an electronic switch device for switching power applied to the load, the load having sufficient inductance to limit the rate of change of current through the electronic switch device via the first current path during at least a first interval of time; and circuitry providing a second current path including an inductor connected in series with a diode, the second current path connected in parallel with the load, the inductor having sufficient inductance to limit the rate of change of current through the electronic switch device via the second current path during at least a second interval of time, wherein the average time in which current flows through the inductor is substantially less than the average time in which current flows through the electronic switch device.

In accordance with another aspect of the present invention, a dynamic braking circuit is provided for an electric power conversion system having DC power terminals, a DC-to-AC inverter coupled to the DC power terminals, and an AC motor coupled to the DC-to-AC inverter. The dynamic braking circuit, also coupled to the DC power terminals, comprises: a braking resistor R coupled to a first of the DC power terminals and having a minimum inductance $L_{R(MIN)}$; a chopper circuit including: a semiconductor device S, coupled in series with the braking resistor and coupled to a second of the DC power terminals, for switching DC power to the braking resistor, the semiconductor device having a maximum instantaneous current rating $di/dt_{S(MAX)}$ which would generally require the use of a series inductor T to limit $di/dt_{S(MAX)}$, wherein such a series inductor T would require a maximum current rating $I_{T(MAX)}$, an average current rating $I_{T(AVE)}$, and a minimum inductance $L_{T(MIN)}$ at a given voltage, wherein the minimum inductance $L_{R(MIN)}$ of the braking resistor R is greater than $L_{T(MIN)}$; and a di/dt reactor U coupled in series with a freewheeling diode V to form a series combination U-V which is coupled in parallel with the braking resistor R, the chopper circuit being configured such that, on the average, the di/dt reactor U has current flowing through it for less than the time current is flowing through the semiconductor device.

In the preferred embodiment of the present invention, a braking resistor circuit is provided for an electric power conversion system, wherein the circuit comprises: a power node having positive DC voltage, a ground node having negative DC voltage, a control node having a control voltage, and a switched node; a thyrister device having its anode terminal connected to the power node, its cathode terminal connected to the switched node, and its gate terminal connected to the control node; a braking resistor having a given inductance value, and further having a first terminal connected to the switched node and a second terminal connected to the ground node; and a freewheeling circuit comprising a freewheeling diode connected in series with a di/dt reactor, the freewheeling circuit connected between the switched and ground nodes such that the cathode of the freewheeling diode is directed toward the switched node.

The present invention is particularly adapted for use in rapid transit vehicles, wherein the thyrister device of the chopper circuit is required to handle currents on the order of hundreds of amperes during the dynamic braking operation. According to the invention, the internal inductance of the dynamic braking resistor is utilized in combination with a reduced-size di/dt reactor to limit the di/dt of the thyrister. This circuit configuration provides the advantage that the RMS current through the di/dt reactor is much smaller than that of prior art schemes, thus permitting the use of a di/dt reactor having significantly-reduced power handling capabilities. Hence, the size, weight, and cost of the di/dt reactor, and effectively the entire chopper circuit, is significantly reduced.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description, when taken in conjunction with the accompanying drawings, in which:

FIGS. 4a and 4b are representative current and voltage waveform diagrams for the circuit of FIG. 3a.

DETAILED DESCRIPTION OF THE PREFERRED EMBODIMENTS

Figure 1:
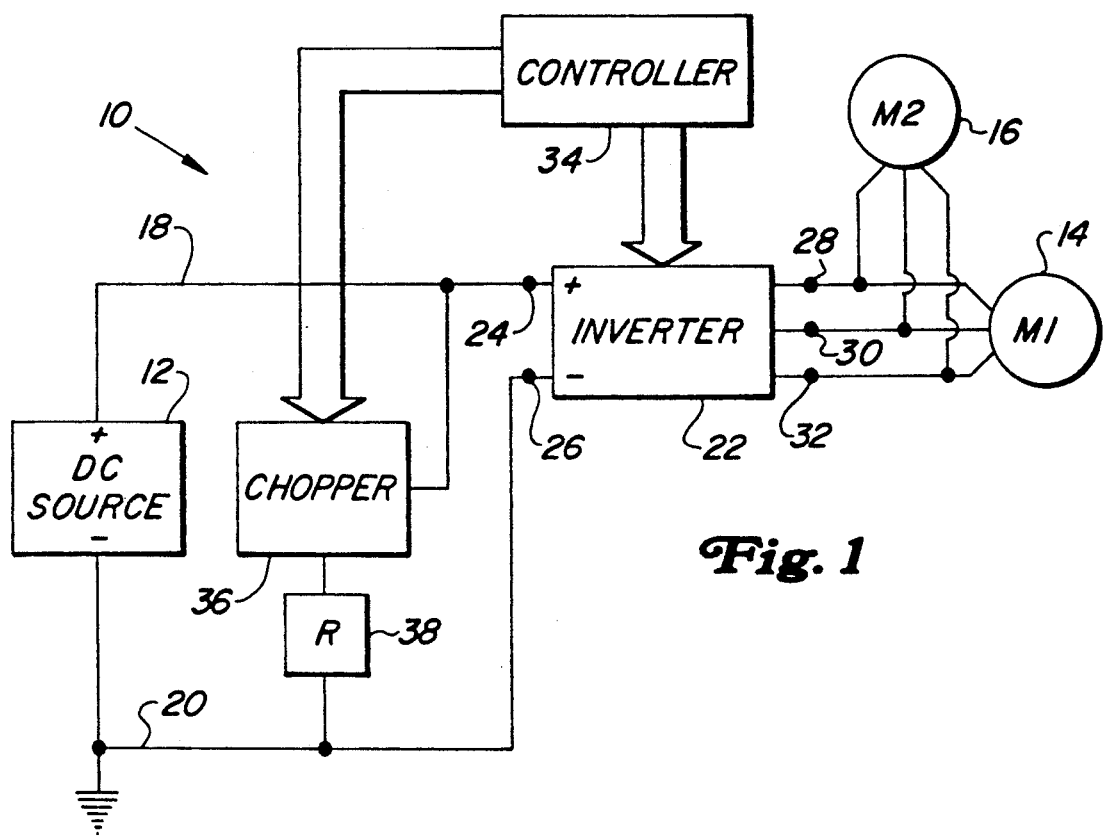
FIG. 1 is an electrical block diagram of an electric power conversion system for use with the present invention.

Referring now to FIG. 1 of the accompanying drawings, there is shown an electric power conversion system 10 for conveying power between a DC power source 12 and an electric load. In this embodiment, the load comprises first and second electric motors 14 and 16 connected in parallel. In the preferred embodiment of the invention, the motors 14 and 16 are three-phase AC induction-type traction motors used for propelling a transit vehicle, and the DC source 12 comprises a wayside power distribution system including either a third rail or an overhead catenary with which a current collector on the vehicle makes sliding or rolling contact.

In FIG. 1, a positive conductor 18 represents a current collector, and a negative conductor 20 represents a conductor in contact with a grounded rail serving as the other terminal of the DC source. Alternatively, the power conversion system 10 on board the vehicle may be connected to the power source via a two-wire trolley in contact with two parallel conductors of an overhead catenary. The magnitude of the DC voltage between the conductors 18 and 20 is typically in the range from 600 volts (nominal) to 1000 volts (maximum). Each of the motors 14 and 16 typically has a full-load rating on the order of 300 horsepower.

The electric power conversion system 10 further includes a controllable inverter 22 which, in the preferred embodiment, is a voltage source inverter having a pair of DC terminals 24 and 26 on its source side, and a set of three AC terminals 28, 30, and 32 on its motor side. The DC terminals 24 and 26 are connected to the positive and negative source voltage conductors 18 and 20, thus serving as the DC link between the power source 12 and the inverter 22. The AC terminals 28, 30, and 32 are respectively connected to the three different phase windings of each of the AC motors 14 and 16.

In the motoring mode of operation, i.e., when electric power is being conveyed from the DC source to the motors, direct current is supplied to the inverter 22 through its DC terminals 24 and 26, and the inverter serves to convert this direct current into alternating current supplied through the AC terminals 28, 30, and 32 to the motors 14 and 16. A system controller 34 provides the proper control signals to the inverter 22 such that the inverter serves to convert the DC voltage at its DC terminals into a three-phase AC voltage at its AC terminals, and to vary the amplitude and frequency of the alternating voltage to provide the needed acceleration or deceleration of the vehicle driven by the motors 14 and 16. Pulse-width modulation (PWM) control is typically used for this control technique. Examples of inverters and system controllers which may be utilized in the power conversion system 10 are disclosed in Plunkett U.S. Pat. No. 3,890,551, D'Atre et al. U.S. Pat. No. 4,761,600 and Plunkett U.S. Pat. No. 4,047,083.

During dynamic braking, each of the motors 14 and 16 operate as an electrical generator driven by the inertia of the transit vehicle, thus returning power to the system 10. This return power flows through the inverter 22 in a reverse direction from the direction of flow during motoring, and appears as a DC voltage at the DC terminals 24 and 26. Dynamic braking is effected by connecting a chopper circuit 36 and a dynamic braking resistance 38 across the conductors 18 and 20 of the DC link.

The chopper circuit 36 controls the power in the braking resistor 38. When the chopper circuit is turned on, the braking resistor 38 serves to dissipate the electric energy in the form of heat. As is well known to persons skilled in the art, the chopper circuit 36 typically includes a solid state semiconductor switch that can be repetitively turned on and off by suitable control signals from the system controller 34. In particular, the system controller 34 controls the ratio of the "on time" to the "off time", or duty cycle, of the chopper 36 during successive intervals, each typically of a fixed period. The average magnitude of current flowing through the braking resistor 38 varies directly with this duty cycle.

Figure 2:
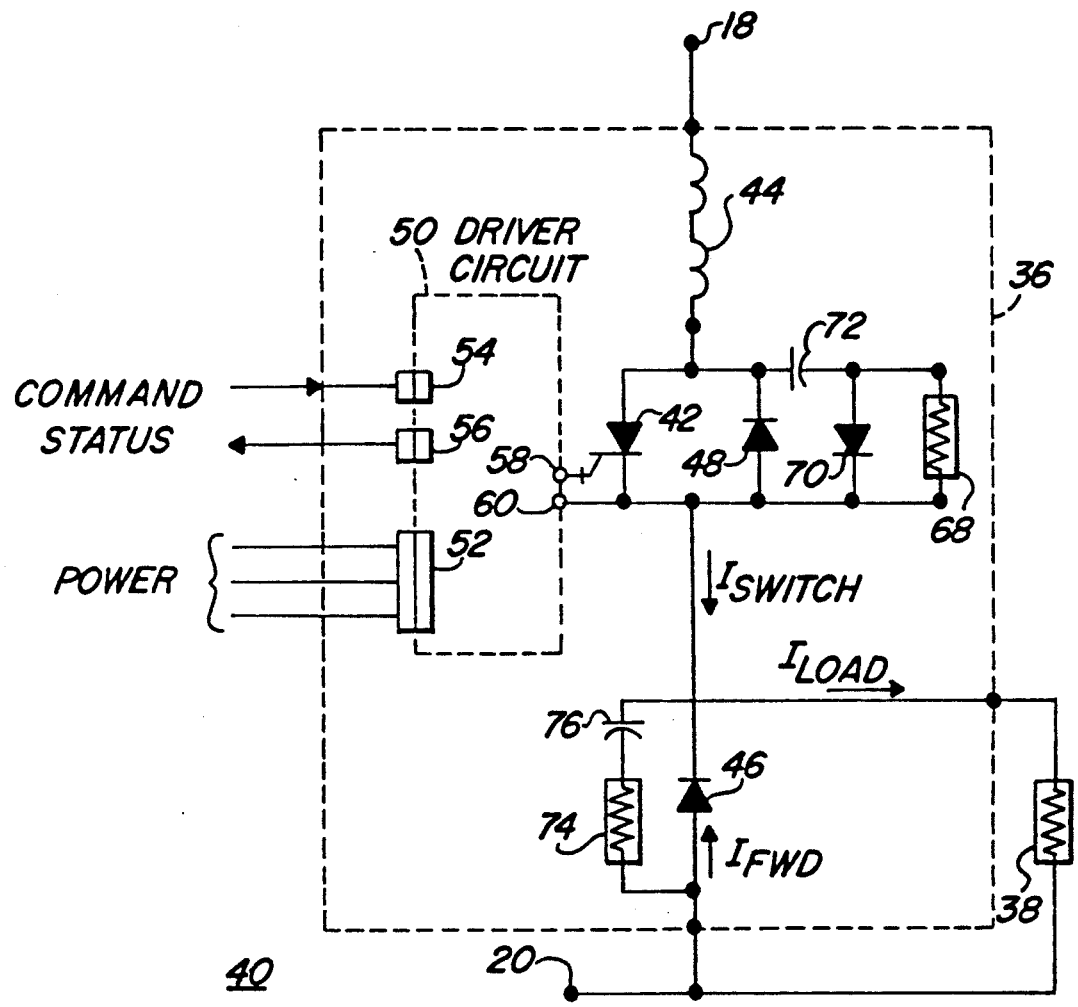
FIG. 2 is an electrical schematic diagram of a dynamic braking circuit commonly used for the system of FIG. 1 according to the prior art.

FIG. 2 is an electrical schematic diagram of a dynamic braking circuit 40 in accordance with the prior art. The dynamic braking circuit 40 includes the braking resistor 38, as well as the chopper circuit 36. The positive DC voltage conductor 18, and the negative DC voltage conductor 20, are connected to the braking circuit as shown. As is known in the art, current is applied to the braking resistor 38 through a solid state electronic switching device, such as a power thyristor. A silicon controlled rectifier (SCR) or a gate turn-off device (GTO) are two common types of thyrister semiconductor devices which can be used for this electronic switch. A GTO 42 is used in the preferred embodiment. As will be discussed in detail below, it is common practice in the art to protect the GTO 42 against excessive instantaneous changes in current during turn on with the use of a di/dt reactor 44 connected in series with the GTO 42. An anti-parallel diode 48, connected in inverse parallel relationship with the GTO 42, serves to protect the GTO from negative voltage spikes.

The braking resistor 38, also known as a grid resistor, is a physically large device having an extremely large power rating, i.e., in the range of 100–400 kilowatts, yet having a relatively low resistance value, i.e., on the order of 1 ohm. Since a braking resistor is typically constructed from large metallic sheets, it inherently has a large internal inductance value on the order of 200 microhenrys. As a consequence of this large inductance value, a freewheeling diode 46 is typically connected in inverse parallel relationship with the braking resistor 38 in order to conduct current through the braking resistor 38 when the GTO 42 is turned off.

Several other components are included in the chopper circuit 36. A GTO driver circuit 50 is used to interface the system controller 34 to the GTO 42. The GTO driver circuit 50 utilizes power supplied at a power connector 52, command signals available at a connector 54, to generate a status signal available at a connector 56 which is characteristic of the gate control voltage applied to the gate terminal 58 of the GTO 42. The cathode terminal of the GTO 42 is also connected to the driver circuit 50 at terminal 60. The construction of the GTO driver circuit 50 is known in the art.

As is also known in the art, a number of "snubber" components are typically used to limit the rate of change of voltage across the various semiconductor devices. For example, a snubber capacitor 72, a snubber diode 70, and a snubber resistor 68 limit the dv/dt across the GTO 42. A snubber capacitor 76 and a snubber resistor 74 limit the dv/dt across the freewheeling diode 46.

In order to adequately protect the GTO from excessive current during turn on, the minimum inductance value $L_{MIN}$ of the di/dt reactor 44 must be sufficient to limit the di/dt to that which is within the GTO manufacturer's specification. For example, if a 2500 volt, 2000 ampere GTO were used as the GTO 42, the manufacturer's specification states that the maximum instantaneous change in current, or $di/dt_{MAX}$, must be limited to 500 A/µsec. If 600 volts DC is applied across power conductors 18 and 20, then the minimum inductance value of the di/dt reactor 44 must be:

$$V = L_{MIN}(di/dt_{MAX}) \text{ or}$$
$$L_{MIN} = V/(di/dt_{MAX}) \text{ or}$$
$$L_{MIN} = 600 \text{ volts}/(500 \, A/\mu s) \text{ or}$$
$$L_{MIN} = 1.2 \, \mu H$$

in order to meet the di/dt$_{MAX}$ specification and protect the GTO. If, for example, the di/dt reactor 44 had an inductance value of 5 μH, then the di/dt$_{MAX}$ would be 600 volts/5 μH or 120 A/μsec, which is well within the manufacturer's specification.

In FIG. 2, the RMS current through the braking resistor 38 is designated as I$_{LOAD}$, the current through the di/dt reactor 44 and the GTO 42 as I$_{SWITCH}$, and the current through the freewheeling diode 46 as I$_{FWD}$. In operation, the dynamic braking circuit 40 has two primary current paths, a first current path when the GTO is turned on, and a second current path when the GTO is turned off. The first current path runs from the power conductor 18, through the di/dt reactor 44, the GTO 42, and the resistor 38, to the negative conductor 20, when the GTO is turned on. In other words, when the GTO is turned on, I$_{LOAD}$ is solely comprised of I$_{SWITCH}$ (disregarding the effect of the snubber circuitry).

A second current path exists primarily when the GTO is turned off, since current is briefly maintained due the inductance of the braking resistor 38. The second current path runs through the freewheeling diode 46 and the braking resistor 38. In other words, when the GTO is turned off, I$_{LOAD}$ is solely comprised of I$_{FWD}$ (again disregarding the snubber circuitry).

Note that since the di/dt reactor 44 is directly connected in series with the GTO 42, the same amount of GTO current I$_{SWITCH}$ flows through the di/dt reactor 44, and the amount of time current flows through the di/dt reactor 44 is the same as that amount of time current flows through the GTO 42, disregarding the snubber components. If, for example, the GTO's on time were equal to its off time, i.e., a fifty percent duty cycle, then the entire braking resistor current I$_{LOAD}$ would flow through the di/dt reactor 44 for approximately fifty percent of the time. Hence, the di/dt reactor 44 must be able to handle large amounts of power. If the average current which flows through the series combination of the di/dt reactor and the chopper thyristor were approximately 500 amperes RMS, the di/dt reactor 44 should have a maximum current rating I$_{MAX}$ of 1000 amperes and an average current rating I$_{AVE}$ of 500 amperes RMS at 5 μH. In order to achieve such a large power rating, a correspondingly large di/dt reactor 44 must be used. As explained above, the size, weight, and cost of such a di/dt reactor is a significant disadvantage of the prior art chopper circuits.

Figure 3A:
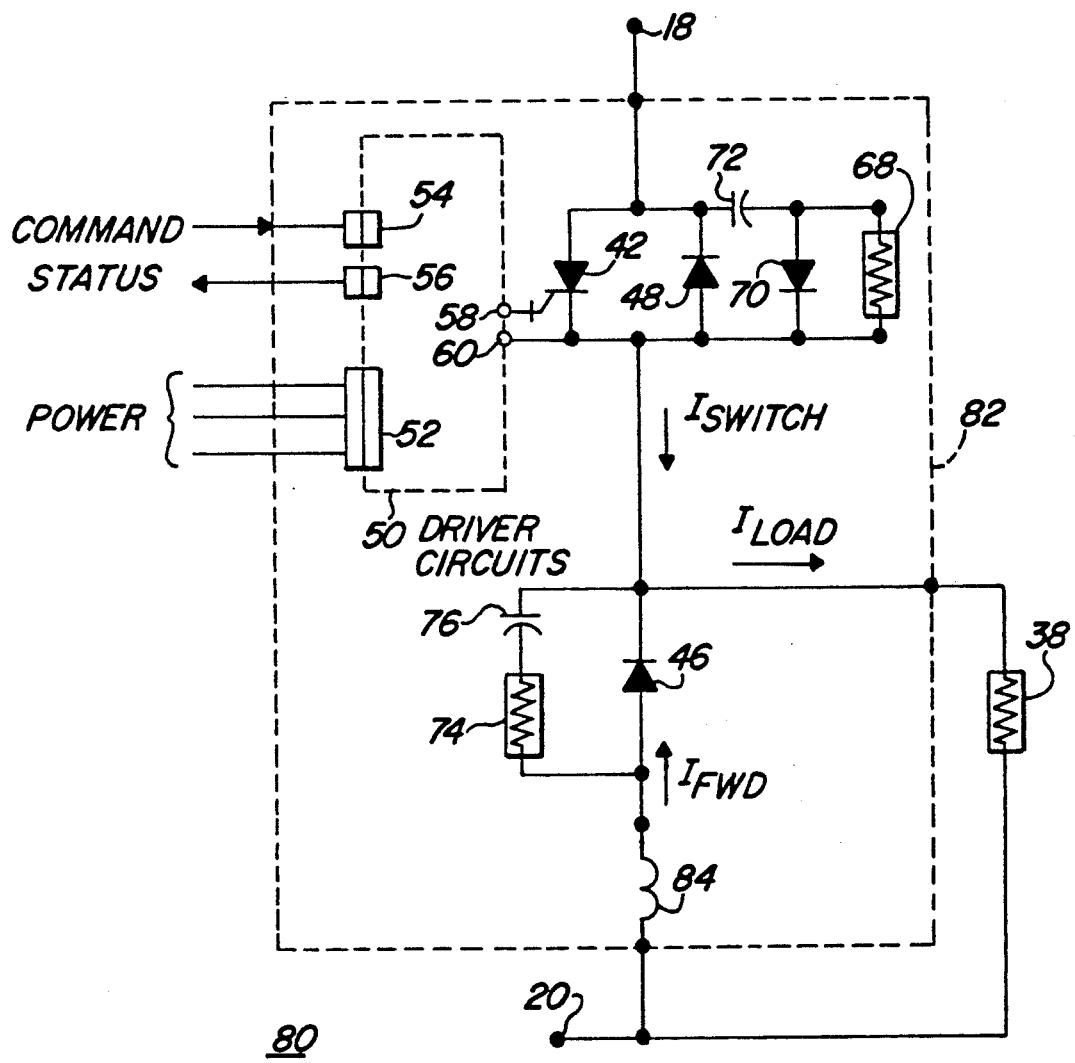
FIGS. 3a and 3b are electrical schematic diagrams of alternate embodiments of the improved dynamic braking circuit of the present invention.

FIG. 3a is an electrical schematic diagram of an improved dynamic braking circuit 80 of the present invention. Note that the improved chopper circuit 82 has been changed to include the di/dt reactor 84 in the second current path, i.e., in series with the freewheeling diode 46, as opposed to being directly connected in series with the GTO 42. The internal inductance of the braking resistor 38, which is typically on the order of 200 μH, is used to limit the di/dt of the GTO 42 during one portion of its switching cycle, while the di/dt reactor 84 is used to limit the di/dt of the GTO 42 during another portion of the cycle. As will be seen below, the average time in which current flows through the di/dt reactor 84 is less than one-tenth the average time in which current flows through the GTO 42. For example, in the preferred embodiment using a 50% duty cycle, current flows through the GTO 42 for 1-10 milliseconds, whereas current flows through the di/dt reactor 44 for only 100-200 microseconds. Although the maximum current rating of the di/dt reactor 84, I$_{84(MAX)}$, should remain approximately the same as that of the di/dt reactor 44 of the prior art circuit, I$_{44(MAX)}$, the reduced time of current flow means that the average current rating of the di/dt reactor 84, I$_{84(AVE)}$, can be drastically reduced from that of the di/dt reactor 44, I$_{44(AVE)}$. For example, I$_{44(AVE)}$ must be 500 amperes RMS, while I$_{84(AVE)}$, in the preferred embodiment, is only 40 amperes RMS. This reduction in power rating allows for a corresponding reduction in size and weight from the di/dt reactor 44 of the prior art.

The remaining components of the dynamic braking circuit 80 are the same as those shown in FIG. 2. As is apparent to those familiar with chopper circuits, the braking resistor 38 represents a load which has its power controlled by the chopper 36. According to the present invention, this load can be almost any type of inductive load. More specifically, the chopper circuit of the present invention can also be used with DC motors as the inductive load.

Figure 3B:
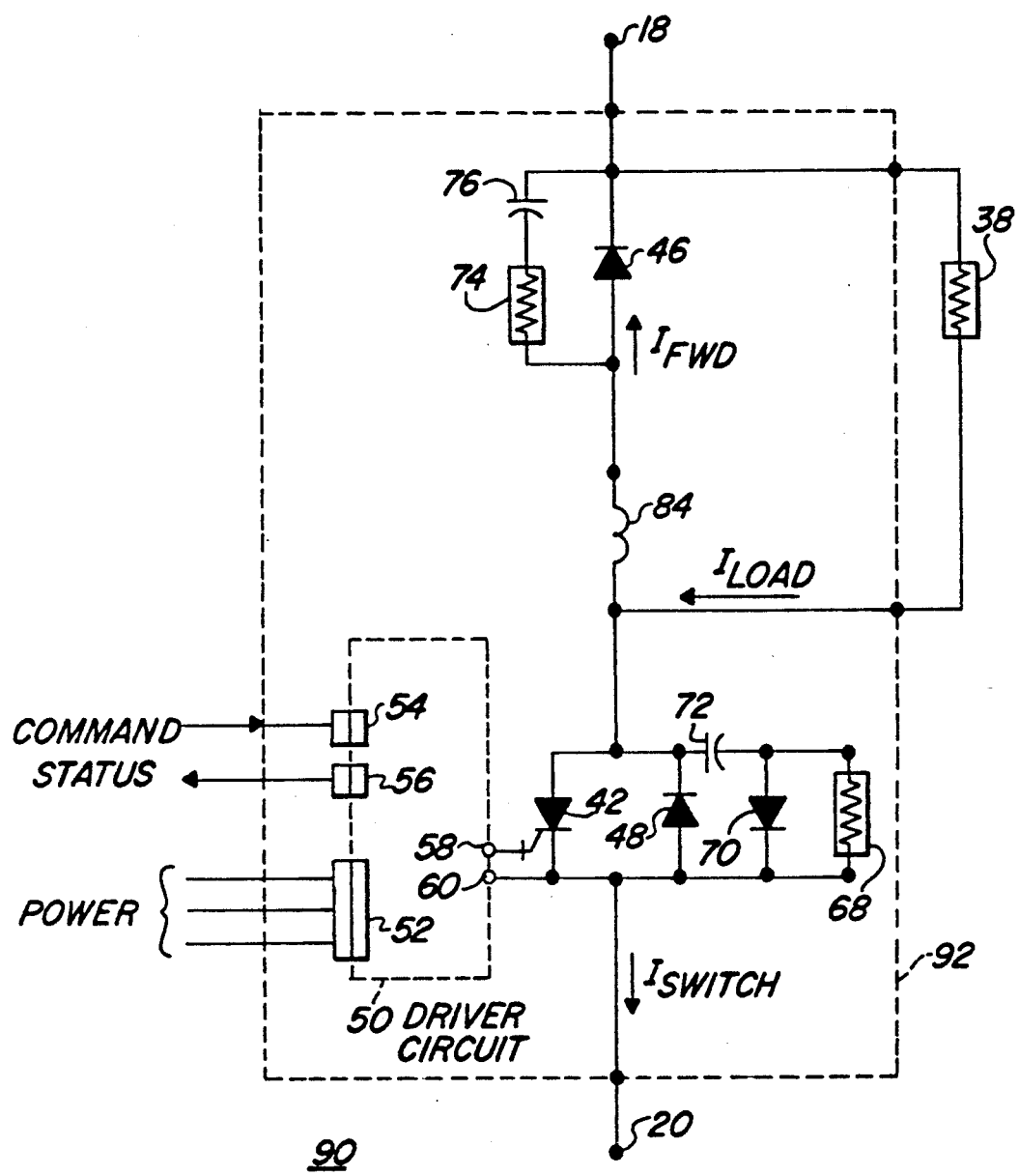

FIG. 3b is an electrical schematic diagram of an alternate embodiment of the improved dynamic braking circuit of the present invention. Here, the electrical configuration of a dynamic braking circuit 90 has been modified from that of circuit 80 in that the GTO 42 of the chopper 92 is connected to the negative conductor 20, while the braking resistor 38 is connected to the positive conductor 18. The remaining circuitry is substantially the same as that shown in FIG. 3a.

Figure 4A:
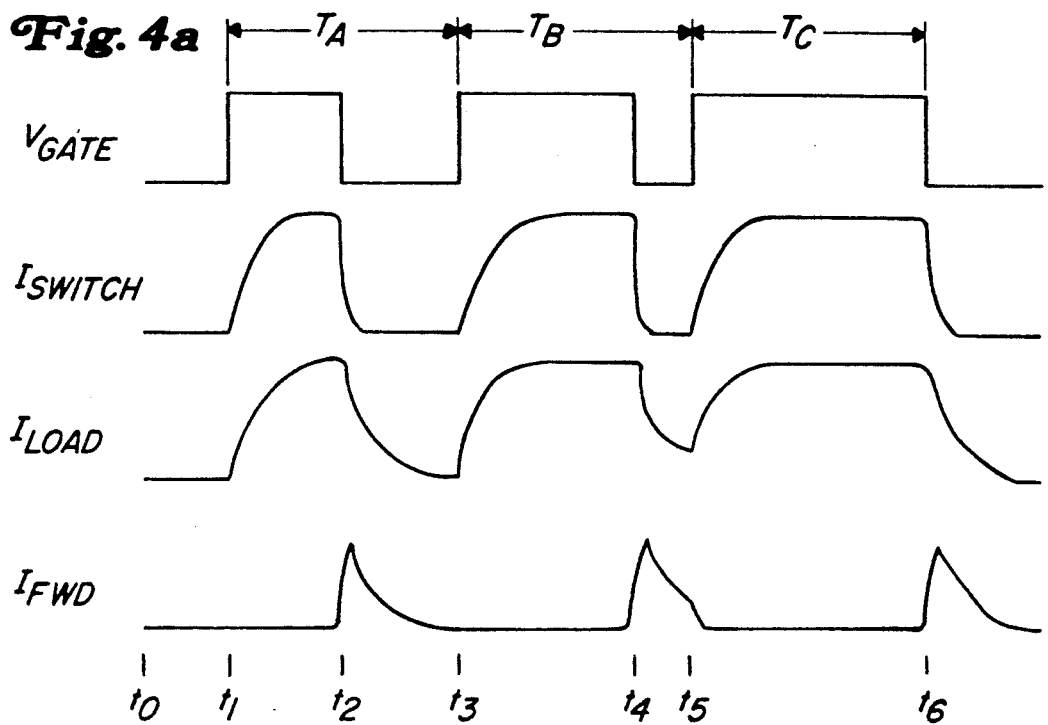
Figure 4B:
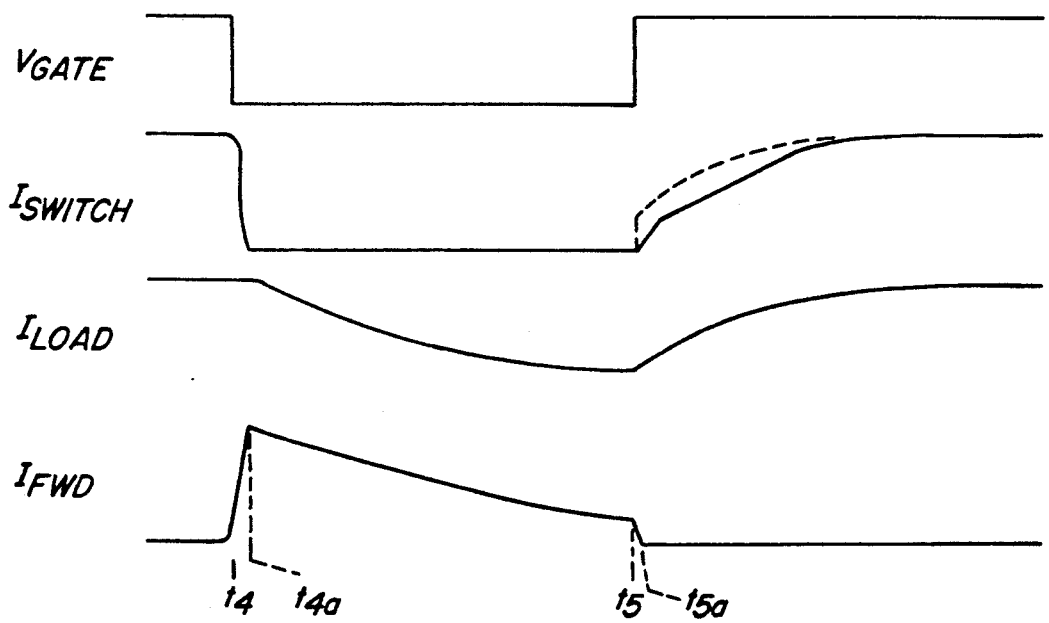

FIGS. 4a and 4b represents voltage and current waveforms for the dynamic braking circuit of FIG. 3a, although the waveforms for FIG. 3b will be substantially the same. Before explaining the waveforms in detail, the following points concerning these figures should be noted. First, FIG. 4a represents three time periods T$_A$, T$_S$, and T$_C$, which illustrate vastly different timing cycles for purposes of illustration. Hence, FIG. 4a is not intended to be a representative sample of a continuous operating waveform. Second, the rise and fall times of the waveforms in the figures have been exaggerated to more clearly illustrate the operation of the circuit. Although the waveforms are not drawn to scale, the specific time constants used will be explained where relevant. Third, FIG. 4b is an expanded waveform illustration of the interval between times t$_4$ and t$_5$ of FIG. 4a.

The first waveform of FIG. 4a, labelled V$_{GATE}$, represents the voltage applied to the gate of the GTO 42 of FIG. 3a. For the first time period T$_A$, a 50% duty cycle is illustrated. A much larger duty cycle is illustrated for time period T$_B$, i.e., approximately 75% or larger. A 100% duty cycle is illustrated for time period T$_C$, i.e., the GTO 42 is turned on for the full time period. For purposes of illustrating the operation of the preferred embodiment, assume that these time periods are approximately 5 milliseconds (msec) in duration.

The next waveform, I$_{SWITCH}$, illustrates the current through the parallel combination of the GTO 42, the anti-parallel diode 48, and the snubber circuitry as shown in FIG. 3a. The third waveform, I$_{LOAD}$, illustrates the current through the inductive braking resistor 38. The fourth waveform, $I_{FWD}$, illustrates the current through the freewheeling diode 46, its parallel snubber components, and the di/dt reactor 84.

Beginning at time $t_0$, no current is flowing through the circuit. Starting with time period $T_A$ at time $t_1$, the GTO 42 is immediately turned on by the voltage rise in $V_{GATE}$, but the GTO's instantaneous change in current, or its di/dt, is limited by the inductance of the resistor 38. Hence, $I_{SWITCH}$ is shown to have a slow rise time, which is on the order of 100-200 $\mu$sec. Since the load current $I_{LOAD}$ is the sum of the freewheeling diode current $I_{FWD}$ and the switch current $I_{SWITCH}$, the load current $I_{LOAD}$ exhibits the same 100-200 $\mu$sec rise time.

At time $t_2$, the gate voltage $V_{GATE}$ goes to zero, and the GTO 42 turns off. However, the switch current $I_{SWITCH}$ does not instantaneously fall to zero, since its di/dt is limited by the snubber circuit, the stray inductance of the other components, and the turn-off time of the GTO. The fall time at time $t_2$ is, in practice, on the order of 10-20 $\mu$sec. As $I_{SWITCH}$ falls to zero, the current through the freewheeling diode $I_{FWD}$ rises in a complementary manner to maintain the current $I_{LOAD}$ constant through the resistor 38 for a short interval of time.

The load current through the resistor 38 is maintained by the freewheeling diode circuit from time $t_2$ to sometime before time $t_3$. The fall time of the freewheeling diode current $I_{FWD}$ is determined by the inductance-to-resistance ratio, or $L_R/R_R$, of the braking resistor 38. In practice, the $I_{FWD}$ current through the freewheeling diode and the di/dt reactor 84 typically flows for less than 500 $\mu$sec, and, in the preferred embodiment, is approximately 100-200 $\mu$sec. Since the braking resistor current $I_{LOAD}$ has reached zero before time $t_3$ where the next cycle starts, the current through the braking resistor 38 is said to be discontinuous during time period $T_A$. Hence, the amount of time current flows through the di/dt reactor 84, as seen by the $I_{FWD}$ waveform, is substantially less than the amount of time current flows through the GTO 42 switching device. That is, $I_{SWITCH}$ is approximately 2.5 msec, while $I_{FWD}$ is less than 250 $\mu$sec.

At time $t_3$, the $T_S$ time period starts, and the GTO is again turned on by the positive voltage on its gate. The current through the GTO 42 and the braking resistor 38 rise at a rate where the di/dt is again limited by the inductance of the braking resistor 38.

The GTO is turned off at time $t_4$. However, since the duty cycle is much larger for $T_S$, the GTO is again turned on at time $t_5$ before the braking resistor current $I_{LOAD}$ has had a chance to reach zero. This is called the continuous case, i.e., the braking resistor 38 current is continuous during time period $T_S$ since $I_{LOAD}$ never reaches zero. This continuous case would also occur if the $L_R/R_R$ of the braking resistor were increased with respect to the cycle time.

Referring now to the expanded $t_4$-$t_5$ waveforms of FIG. 4b, it can be seen that the GTO current $I_{SWITCH}$ falls at time $t_4$ at the same rate that the freewheeling diode current $I_{FWD}$ is rising. As explained above, this rise time, i.e., the time interval between time $t_4$ and time $t_{4a}$, is on the order of 10-20 $\mu$sec. As shown from the waveform $I_{LOAD}$, current through the braking resistor 38 is maintained throughout the time interval $t_4$-$t_5$. At time $t_5$, the freewheeling diode current $I_{FWD}$ has substantially decreased from its value at time $t_{4a}$. At time $t_5$, the GTO again turns on. If there were no di/dt reactor 84 in the circuit, the freewheeling diode current $I_{FWD}$ would instantaneously drop to zero, which would allow the complementary current $I_{SWITCH}$ through the GTO to instantaneously rise to the level of the continuous load current $I_{LOAD}$ at time $t_5$. (See dashed $I_{SWITCH}$ waveform at time $t_5$.) In other words, there would not be a $t_5$-$t_{5a}$ time interval in FIG. 4b if $L_{84}=0$. This instantaneous change in $I_{SWITCH}$ would most likely exceed the di/dt$_{MAX}$ specification of the GTO 42.

However, the inductance of the di/dt reactor 84 limits the di/dt of the freewheeling diode current $I_{FWD}$, preventing it from instantaneously falling to zero at $t_5$. Instead, $I_{FWD}$ slowly falls to zero over the time interval $t_5$-$t_{5a}$ with the same time constant of 10-20 $\mu$sec. In reality, the $t_5$-$t_{5a}$ time interval would only be 2-3 $\mu$sec in the example shown in FIG. 4b, since the value of $I_{FWD}$ has already been reduced at time $t_5$. Nevertheless, the di/dt limiting effect of the di/dt reactor 84 prevents the complementary current $I_{SWITCH}$ through the GTO from instantaneously rising to the level of the continuous load current $I_{LOAD}$ at time $t_5$. Hence, the di/dt through the GTO 42 is controlled by the di/dt reactor 84. Again note that the $I_{FWD}$ time constant between time $t_{4a}$ and time $t_5$ is determined primarily by the $L_R/R_R$ ratio of the braking resistor 38, while the time constant between time $t_5$ and time $t_{5a}$ is determined primarily by the inductance of the di/dt reactor 84.

Again referring to FIG. 4a, time period $T_C$ illustrates the case where the GTO 42 would be turned on for an entire cycle. In such a case, the current through the GTO, $I_{SWITCH}$, would furnish all the current through the braking resistor 38, $I_{LOAD}$, as illustrated. At time $t_6$ when the GTO turns off, the freewheeling diode again maintains the current through the braking resistor 38 for a very short period of time.

As can now be seen from FIG. 4a, particularly during time period $T_C$, current does not flow through the di/dt reactor for the same amount of time current is flowing through the GTO—even when the GTO is turned on continuously. In the case of the prior art circuit of FIG. 2, current would flow through the di/dt reactor 44 whenever current flows through the GTO 42. If a 100% duty cycle occurred in the prior art circuit, the current through the di/dt reactor 44 would also be flowing 100% of the time, which would necessarily require a very high continuous current rating $I_{AVE}$ for the di/dt reactor 44. In contrast, the continuous current rating for the di/dt reactor 84 of the present invention can be significantly reduced from that normally required, since the GTO current is not the same as the di/dt reactor current. More specifically, the circuit configuration of the preferred embodiment permits the use of a di/dt reactor having an RMS current rating of only 40 amperes at 5 $\mu$H, even though the GTO still must handle an average of 500 amperes RMS at 600 volts DC. In the preferred embodiment, this markedly reduced power rating for the di/dt reactor 84 allows a corresponding reduction in size to 3.75 inches in diameter $\times$ 1.25 inches in width, which weighs less than three pounds. A considerable reduction in cost is also achieved.

In review, it can now be seen that the present invention provides an improved a chopper circuit for dynamic braking in an electric power conversion system having an inductive braking resistor. Instead of connecting a di/dt reactor directly in series with the GTO, a di/dt reactor is connected in series with the freewheeling diode. Using this configuration, the combination of the inductive braking resistor and the di/dt reactor limit the di/dt of the GTO during turn on and turn off. However, the di/dt reactor does not conduct current during the entire time the GTO conducts current. This fact allows for the use of a di/dt reactor having a much lower average current rating, and accordingly, a significantly reduced size, weight, and cost.

While specific embodiments of the present invention have been shown and described herein, further modifications and improvements may be made by those skilled in the art. For example, various equivalent circuit configurations may be constructed for different applications using the teachings of the invention. All such modifications which retain the basic underlying principles disclosed and claimed herein are within the scope and spirit of the invention.

What is claimed is:

1. A chopper circuit for a load comprising:
   a first current path including the load connected in series with a electronic switch means for switching power applied to the load, the load having sufficient inductance to limit the rate of change of current through the electronic switch means via the first current path during at least a first interval of time; and
   a second current path including an inductor connected in series with a diode and being connected in parallel with the load, the inductor having sufficient inductance to limit the rate of change of current through the electronic switch means via the second current path during at least a second interval of time, wherein the average time in which current flows through the inductor is substantially less than the average time in which current flows through the electronic switch means.

2. The chopper circuit of claim 1, wherein the average time current flows through the inductor is less than one-tenth the average time current flows through the electronic switch means.

3. The chopper circuit of claim 1, wherein the current flowing through the load is substantially equivalent to the sum of the currents flowing through both the electronic switch means and the inductor.

4. The chopper circuit of claim 1, wherein the first current path further includes a diode connected in parallel with the electronic switch means.

5. The chopper circuit of claim 1, wherein the electronic switch means is a thyrister device.

6. The chopper circuit of claim 1, wherein the load is a braking resistor for an electric power conversion system.

7. A chopper circuit for a dynamic braking circuit comprising:
   a first current path including a load connected in series with a GTO for switching power applied to the load, the load having sufficient inductance for limiting the rate of change of current through the GTO via the first current path during at least a first time interval; and
   a second current path including an inductor connected in series with a diode, the second current path being connected in parallel with the load, the inductor having sufficient inductance for limiting the rate of change of current through the GTO via the second circuit path during at least a second time interval such that the average time that current flows through the inductor is substantially less than the average time that current flows through the GTO, thereby providing inductor size and weight reduction.

8. The circuit of claim 7, wherein the inductor is a di/dt reactor.

9. The circuit of claim 7, wherein the average time that current flows through the inductor is less than one-tenth (1/10) the average time the current flows through the GTO.

10. A chopper circuit for a dynamic braking circuit comprising:
    a GTO, operatively connected in series with a load, for switching power applied to the load, the load having sufficient inductance for limiting the rate of change of current through the GTO during at least a first time interval; and
    a di/dt reactor, operatively connected in series with a diode and in parallel with the load, the di/dt reactor having sufficient inductance for limiting the rate of change of current during at least a second time interval such that the average time that current flows through the di/dt reactor is substantially less than the average time that current flows through the GTO, thereby providing for significant di/dt reactor size and weight reduction.

11. The circuit of claim 10 wherein the average time that current flows through the di/dt reactor is less than one-tenth (1/10) the average time that current flows through the GTO.

* * * * *